(No Model.)
E. L. RANSOME.
MANUFACTURE OF MONOLITHIC PIPES IN SITU.
No. 517,808. Patented Apr. 3, 1894.
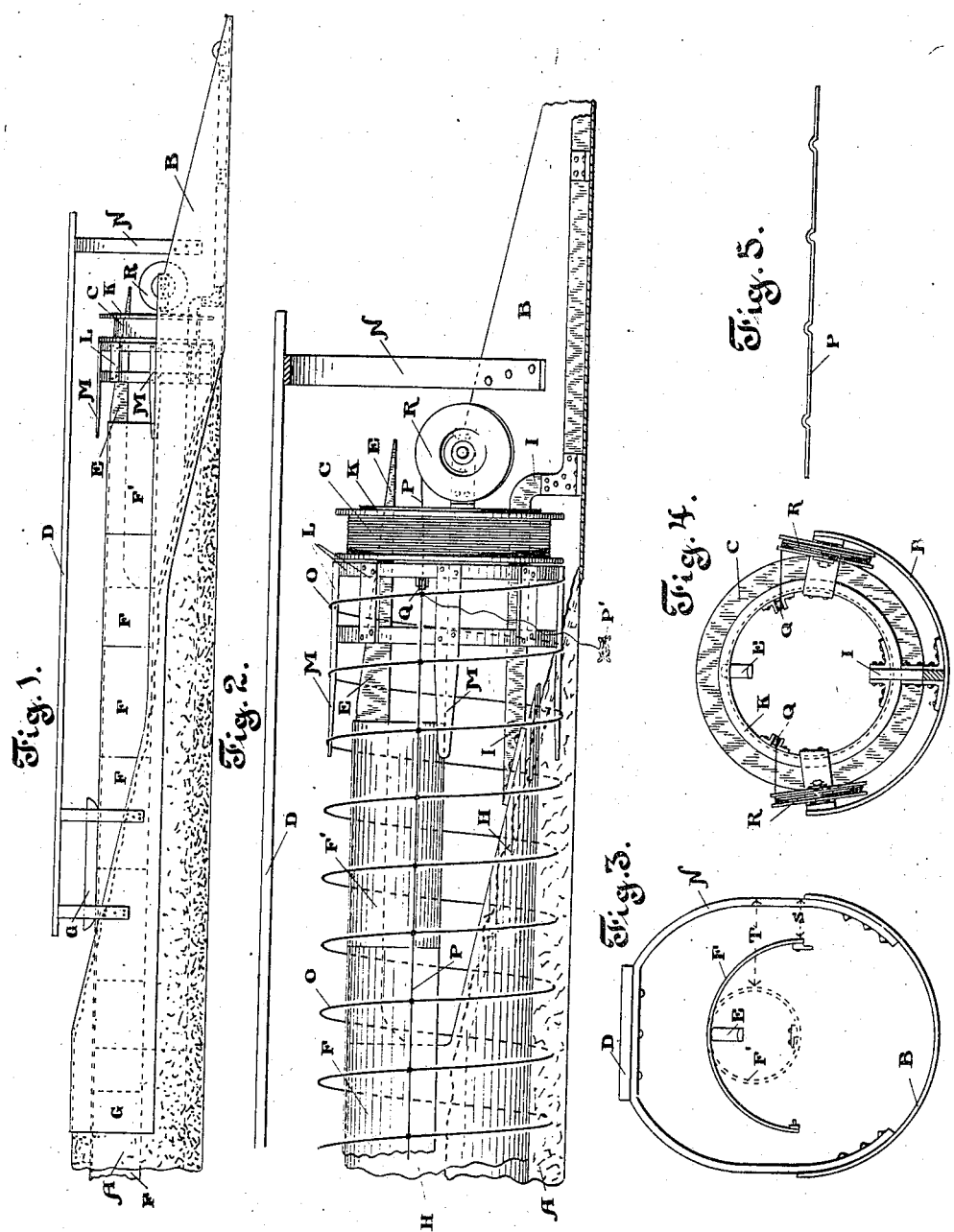
Witnesses,
Inventor,

UNITED STATES PATENT OFFICE.

ERNEST LESLIE RANSOME, OF OAKLAND, CALIFORNIA.

MANUFACTURE OF MONOLITHIC PIPES IN SITU.

SPECIFICATION forming part of Letters Patent No. 517,805, dated April 3, 1894.

Application filed February 24, 1893. Serial No. 463,658. (No specimens.)

*To all whom it may concern:*

Be it known that I, ERNEST LESLIE RANSOME, a citizen of the United States, residing at Oakland, in the county of Alameda, and State of California, have invented certain new and useful Improvements in the Manufacture of Monolithic Pipes in Situ, of which the following is a specification.

My invention relates to the molds and methods for which Letters Patent Nos. 353,500 and 424,656 were granted to me on the 30th of November, 1886, and on the 1st of April, 1890, respectively, and for which applications for Letters Patent, Serial Nos. 463,659 and 468,049 have been made.

The object of my improvement is to strengthen the structures made by these molds and methods. I attain this object by embedding rods or wire of iron or other suitable material of great tensile strength within the concrete, and my invention consists in the mode of placing the rods or wire, and in the apparatus employed therefor, and in minor changes necessitated thereby. To avoid confusion the rods or wire so applied, is termed throughout the specification "bond iron."

In carrying out my invention, the bond iron is first coiled about a flanged spool or reel, which revolves upon a fixed, circular, rim-bearing. From this spool the bond iron is withdrawn by the forward action of the mold, its movement being partly controlled and directed by hand. It becomes a spiral as it leaves the reel, the distance between the several rings thereof, and its diameter also, are regulated by hand upon a cage, and also by guides, which hereinafter are more fully described. This spiral, as the molds move forward, is left behind, and gradually becomes embedded in the concrete, where it acts beneficially in giving tensile strength to the pipe in its resistance to the pressure of the fluid it contains, and in distributing over more area any local pressure from the outside.

Where "plates" are used (as described in Patent No. 353,500), in order to meet the changes necessitated by the introduction of the "bond iron," they have to be passed through the center of the circular rim-bearing. In order to prevent them from too greatly obstructing the process of tamping, their ends are temporarily closed together; and to enable them to be the more readily passed along to their final position, a bracket is run out from the upper part of the forward end of the center, or main mold, and passes through the rim-bearing, upon which the plates are placed, and upon which they are caused to slide toward the rear until they reach those which have been already placed, to which they are then fastened, the bracket sliding from under them in due course by the movement of the mold.

As the bond iron and its apparatus occupies the room formerly used by the men who place the concrete, or other material, a gangway for these men is made overhead, and runs from the saddle, or cap mold, to a bearing in front, by preference an arched bearing, springing from the sides of the shaper,—to both of which bearings the platform is securely fastened. The mechanism used for this purpose is illustrated by the following drawings.

Figure 1 represents a general side view of the molds and apparatus. Figs. 2 and 4 represent the apparatus of the reels, cage and other details. Fig. 3 represents the forward bracket carrying the platform and the plates, both coupled and uncoupled, and their relative position to the "shaper." Fig. 5 represents guide wires.

In the drawings: A represents the pipes. B the "shaper." C the main reel. D the platform. E the plate bracket. F the plates. F' the plates closed. G the saddle mold. H the main or center mold its outline dotted in. I the connecting beam between the main mold and "shaper." K the rim-bearing. L the cage. M the guides. N the platform bracket. O the "bond iron." P one of the guide wires. P' one of the binding wires and spool. Q pulleys conducting guide wires. R reels for guide wire.

In order to meet the requirements of this new method, the draft beam I, which connects the shaper with the main or center mold, is curved so as to make room for the reel and cage. The circular rim-bearing is stayed to the shaper by any of the usual ways. To this rim-bearing is attached a drum or cage, upon which the bond iron is shaped, and from it, guides project to the rear, which further control the position of the bond iron until it becomes sufficiently secured in the concrete.

The auxiliary reels R, may be placed in any suitable position where they will offer least obstruction to the operator. The wire from there can be so easily led through little pulleys, that the placing of these reels at the most convenient place for the operators is an easy task. They are shown attached to the sides of the shaper, but they could be as readily attached to the under side of the platform.

In operation, the bond iron is first wound upon the main reel C, then, while the concrete pipe is being made, it passes from this reel onto the cage L, and is there spread apart, as wide as may be desired, and held in place with one or more guide wires P, each one of which is anchored in the concrete at the rear end, and passes along in the direction of the pipe, forward to, and across the cage, and between the cage and the bond iron around the cage, its free end terminating in an auxiliary reel R. The connection between the bond iron and guide wires may be made in any convenient way; by preference a smaller wire P, is placed in a hand spool and is wrapped around both guide wire and bond iron at their junction so as to hold them together in their relative positions, and is then continued along the guide wire until the next point of junction between the guide wire and the bond iron is reached, when it is wrapped as before, and so on indefinitely, in a similar manner to that in which the vertical wires of a bird cage are often spaced and tied to the horizontal bar. For the purpose of better gaging and locking, these guide wires may be indented at the required intervals, as shown in Fig. 5. As the cage, by the general forward movement of the molds, is drawn away from the bond wire, the guides M, which are attached to the cage, take its place in supporting the bond iron, and by the time they are withdrawn the bond iron is sufficiently embedded in the concrete to require no further guidance. While this is progressing, the plates F, are closed as illustrated by F', and, being placed as needed upon bracket E, they are passed along upon this bracket through the rim-bearing K, to their final position. By referring to Fig. 3, it will be seen, that, unless the plates were so closed, they would prevent the placing of the concrete from the gangway overhead; for when open, the only available space for the material to fall through, would be that at S, which would be limited to the thickness of the wall of the pipe itself, a space totally inadequate and impracticable, whereas, by closing the plates, a space T is obtained, which is four times larger, and is sufficient.

In cases where the limited character of the work does not justify or render expedient the outlay necessary for establishing the entire apparatus, portions of it may be dispensed with. For instance, the auxiliary reels R, or all the reels, might be omitted, or the main or all reels might be retained and the cage dispensed with, but by such action much would have to be done by hand, and the progress of the work would be very slow.

For the purposes of this invention, I regard asphalt and brickwork as but the equivalent of concrete.

What I claim as my invention, and desire to secure by Letters Patent, is—

1. The method of embedding bond iron in monolithic pipe built *in situ*, consisting in setting up the iron in a continuous spiral inside of a continuously traveling mold, investing it with the plastic concrete forming the body of the pipe, and retaining the iron in place by guides attached to the mold and to the pipe until it has become embedded in the structure, substantially as described.

2. An apparatus for shaping and placing bond iron for monolithic structures consisting of an earth shaper "B," carrying a cage "L" and its guides "M," together with a reel "C" upon a rim bearing "K" in connection with guide wires "P," substantially as described.

ERNEST LESLIE RANSOME.

Witnesses:
ROSS F. TUCKER,
F. LESLIE RANSOME.